United States Patent [19]
Schwab et al.

[11] Patent Number: 5,860,386
[45] Date of Patent: Jan. 19, 1999

[54] PORTABLE SIGN OR BARRICADE

[75] Inventors: Dale L. Schwab, Shell Rock; Allison J. Baugher; Kenneth A. Budke, II, both of Dunkerton, all of Iowa

[73] Assignee: Service Signing, Inc., Waterloo, Iowa

[21] Appl. No.: 813,518

[22] Filed: Mar. 7, 1997

[51] Int. Cl.$^6$ .............................. E01F 9/018; B60Q 7/00
[52] U.S. Cl. ........................................ 116/63 P; 116/63 C
[58] Field of Search .................................. 116/63 C, 63 P, 116/63 T; 40/606, 608, 610, 612; 248/910; 404/6, 9, 10

[56] References Cited

U.S. PATENT DOCUMENTS

| | | |
|---|---|---|
| D. 309,585 | 7/1990 | Kulp . |
| 2,762,327 | 9/1956 | Weig . |
| 2,808,803 | 10/1957 | Weig . |
| 3,099,244 | 7/1963 | Knapp . |
| 3,247,823 | 4/1966 | Buck et al. . |
| 3,380,428 | 4/1968 | Abrams . |
| 3,451,368 | 6/1969 | Keats . |
| 3,471,114 | 10/1969 | Ball . |
| 3,780,423 | 12/1973 | Lillenthal et al. . |
| 3,795,220 | 3/1974 | Hengesbach . |
| 3,851,616 | 12/1974 | Brown . |
| 3,952,690 | 4/1976 | Rizzo et al. . |
| 4,006,702 | 2/1977 | St. Cry . |
| 4,040,759 | 8/1977 | Skalle . |
| 4,071,224 | 1/1978 | Gilbert . |
| 4,201,975 | 5/1980 | Marcus . |

(List continued on next page.)

FOREIGN PATENT DOCUMENTS

| | | | |
|---|---|---|---|
| 1189494 | 6/1985 | Canada ................................ | 116/63 T |
| 0 462 818 A1 | 12/1991 | European Pat. Off. . | |
| 2615541A1 | 11/1988 | France . | |
| 23107 | 5/1962 | Germany . | |
| 1926703 | 10/1970 | Germany . | |
| 140180 | 2/1980 | Germany . | |
| 2840984 | 3/1980 | Germany ................................ | 404/10 |
| 3017959 | 11/1981 | Germany ................................ | 404/9 |
| 3412999 | 7/1985 | Germany ................................ | 404/10 |
| 3718440 | 12/1988 | Germany ................................ | 40/606 |
| 875635 | 8/1961 | United Kingdom . | |
| 1378954 | 1/1975 | United Kingdom . | |
| 2090313 | 7/1982 | United Kingdom . | |
| 2090625 | 7/1982 | United Kingdom . | |
| 2122239 | 1/1984 | United Kingdom . | |
| 2156409 | 10/1985 | United Kingdom . | |
| 2182965 | 5/1987 | United Kingdom . | |
| 2259931 | 3/1993 | United Kingdom . | |

OTHER PUBLICATIONS

WLI Industries, Inc., 880 N. Addison Rd., Villa Park, IL 60181–7050; Dtd. 131–95; Safety Cade Barricades; 5–pg Brochure; Types I, II, Vertical, S.H.R.P.

Flex–O–Lite, A Lukens Company, P.O. Box 4366, St. Louis, MO 63123–0166 and P.O. Box 968, 16330 Phoebe Ave., LaMirada, CA 90637. Distributor News; 3–pg Brochure; May 25, 1990.

*Primary Examiner*—Elizabeth L. Dougherty
*Assistant Examiner*—Willie Morris Worth
*Attorney, Agent, or Firm*—Zarley, McKee, Thomte, Voorhees & Sease

[57] ABSTRACT

An apparatus for use as a sign or display, for example as a traffic barricade, includes a base that has a hollow cavity that can be filled with ballast, such as sand or water. A receiver is formed in the base to pivotably receive interchangeable vertical signs having display areas with instructions or attention grabbing indicia. The base and vertical sign also cooperate to hold the sign vertical until overcome by a certain amount and direction of force, at which time the sign pivots down to prevent breakage of the apparatus. It can be easily replaced to its original position. The base also cooperates with other removeable items such as a barrel type device which would matably fit around the perimeter of the base. The base is disassemblable from the sign or barrel for handling and storage.

20 Claims, 7 Drawing Sheets

U.S. PATENT DOCUMENTS

| | | |
|---|---|---|
| 4,256,050 | 3/1981 | Barnard . |
| 4,298,186 | 11/1981 | Glass . |
| 4,317,617 | 3/1982 | Charlton . |
| 4,475,101 | 10/1984 | Kulp et al. . |
| 4,489,306 | 12/1984 | Scolari . |
| 4,591,126 | 5/1986 | Berney . |
| 4,596,489 | 6/1986 | Mariol et al. . |
| 4,611,949 | 9/1986 | Schmanski ................................ 404/9 |
| 4,674,431 | 6/1987 | Cory . |
| 4,710,053 | 12/1987 | Kulp et al. . |
| 4,782,783 | 11/1988 | Kulp et al. . |
| 4,792,258 | 12/1988 | Goff .......................................... 404/6 |
| 4,852,511 | 8/1989 | Look et al. . |
| 4,958,954 | 9/1990 | Schmanski et al. . |
| 4,973,190 | 11/1990 | Erwin et al. . |
| 5,026,204 | 6/1991 | Kulp et al. . |
| 5,088,680 | 2/1992 | Farmer ................................ 248/910 X |
| 5,165,818 | 11/1992 | Newhart ..................... 404/10 |
| 5,201,599 | 4/1993 | Kulp et al. . |
| 5,451,118 | 9/1995 | Wilkins et al. . |
| 5,484,225 | 1/1996 | Warner . |
| 5,529,429 | 6/1996 | Pelegrin . |
| 5,630,675 | 5/1997 | Boeger ....................................... 404/6 |
| 5,713,694 | 2/1998 | Monda et al. ............................... 404/9 |

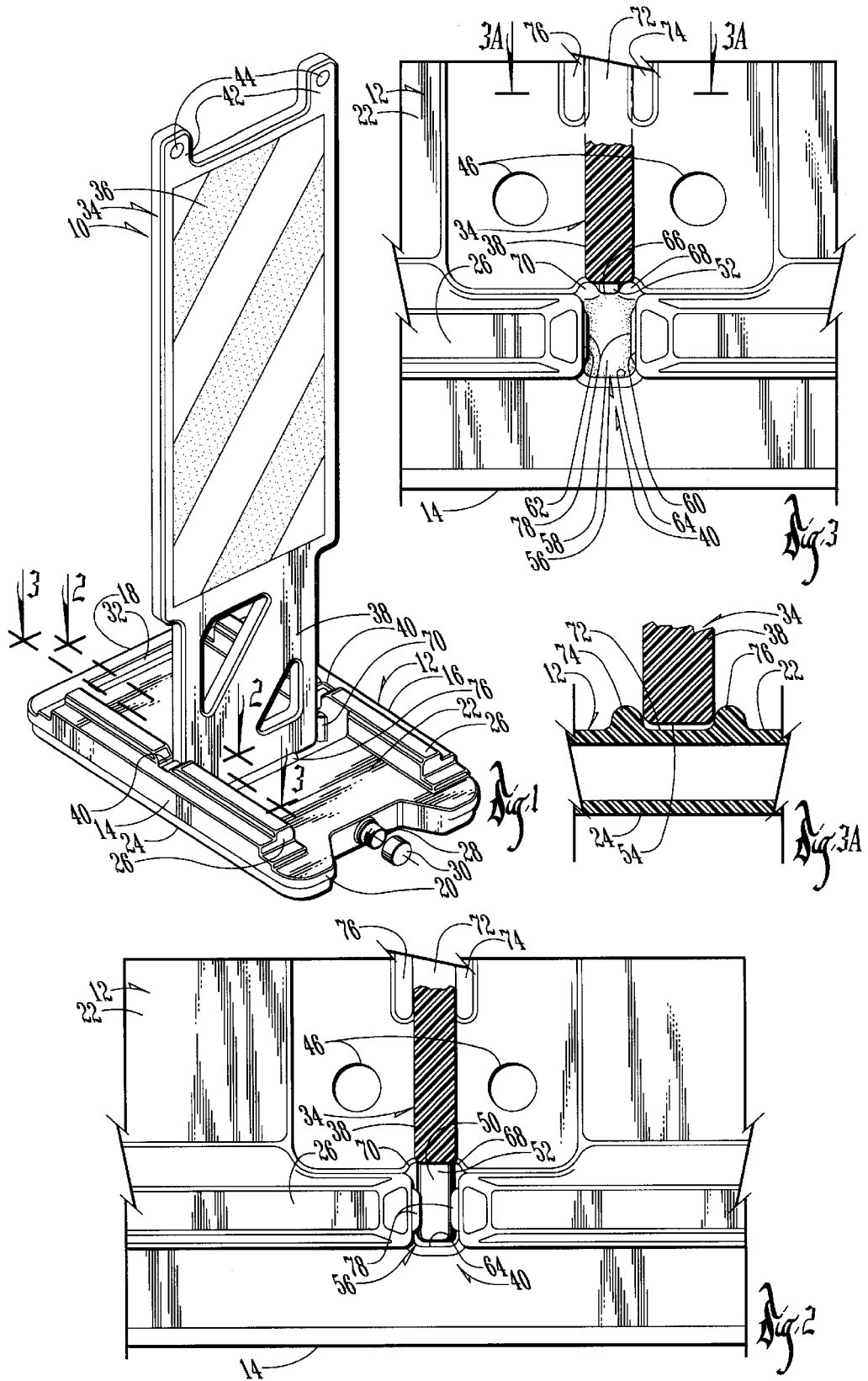

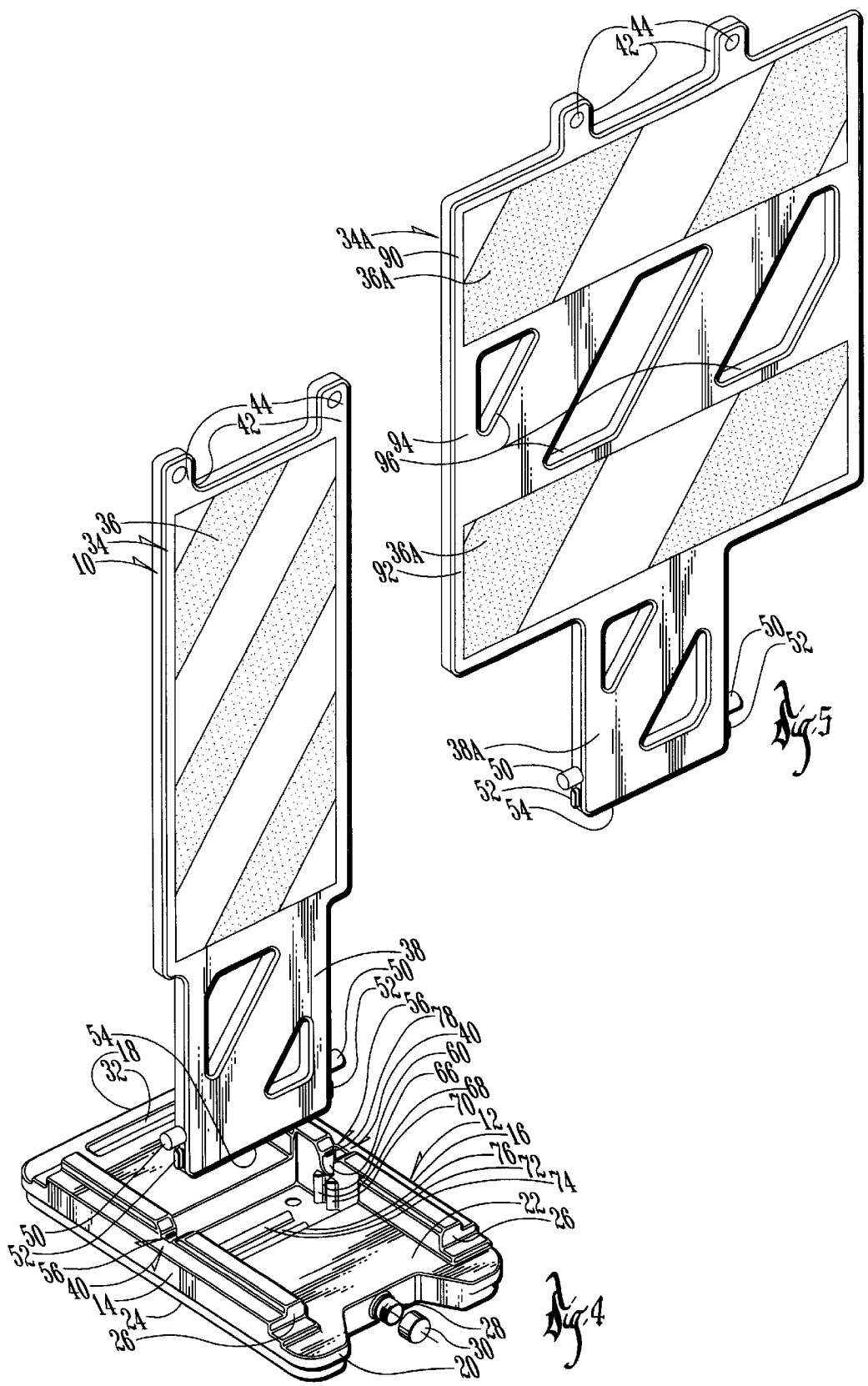

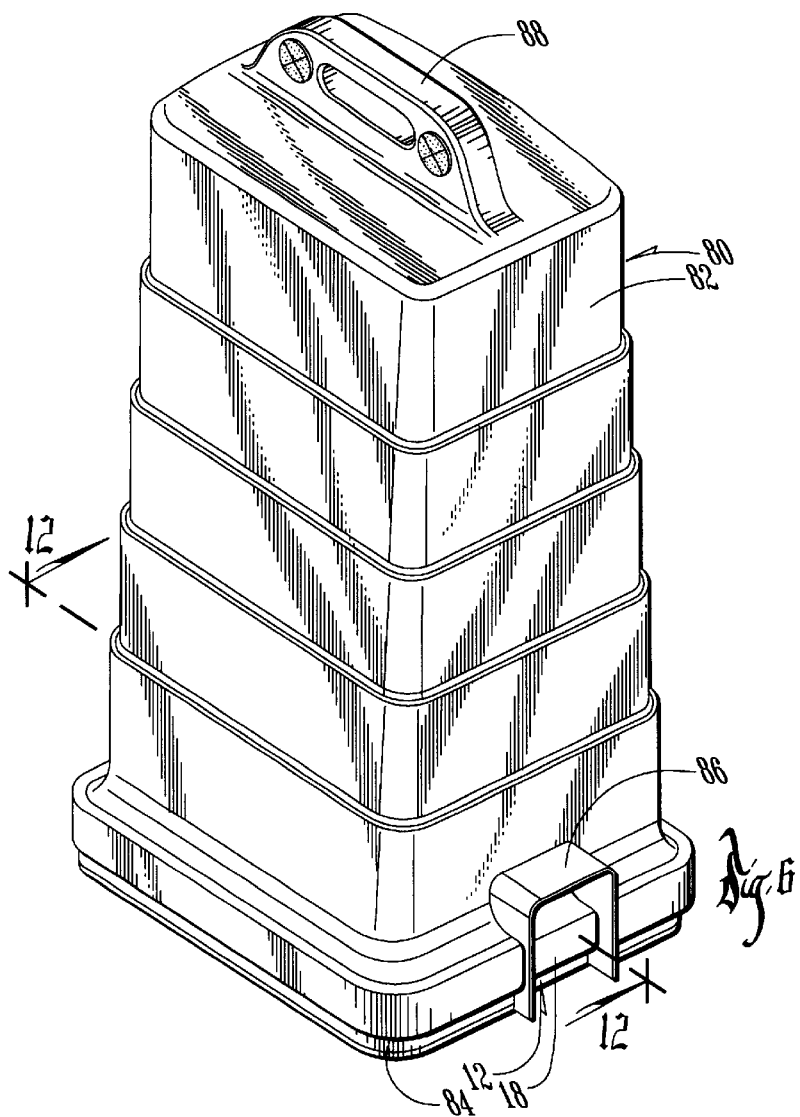
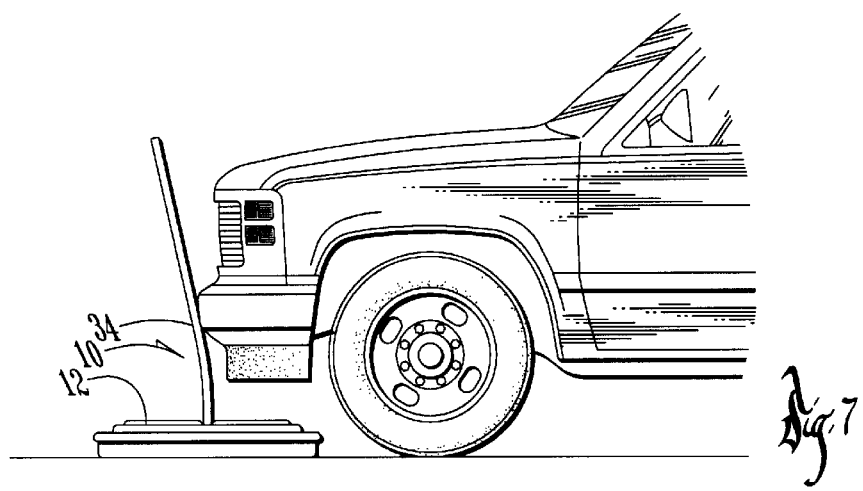

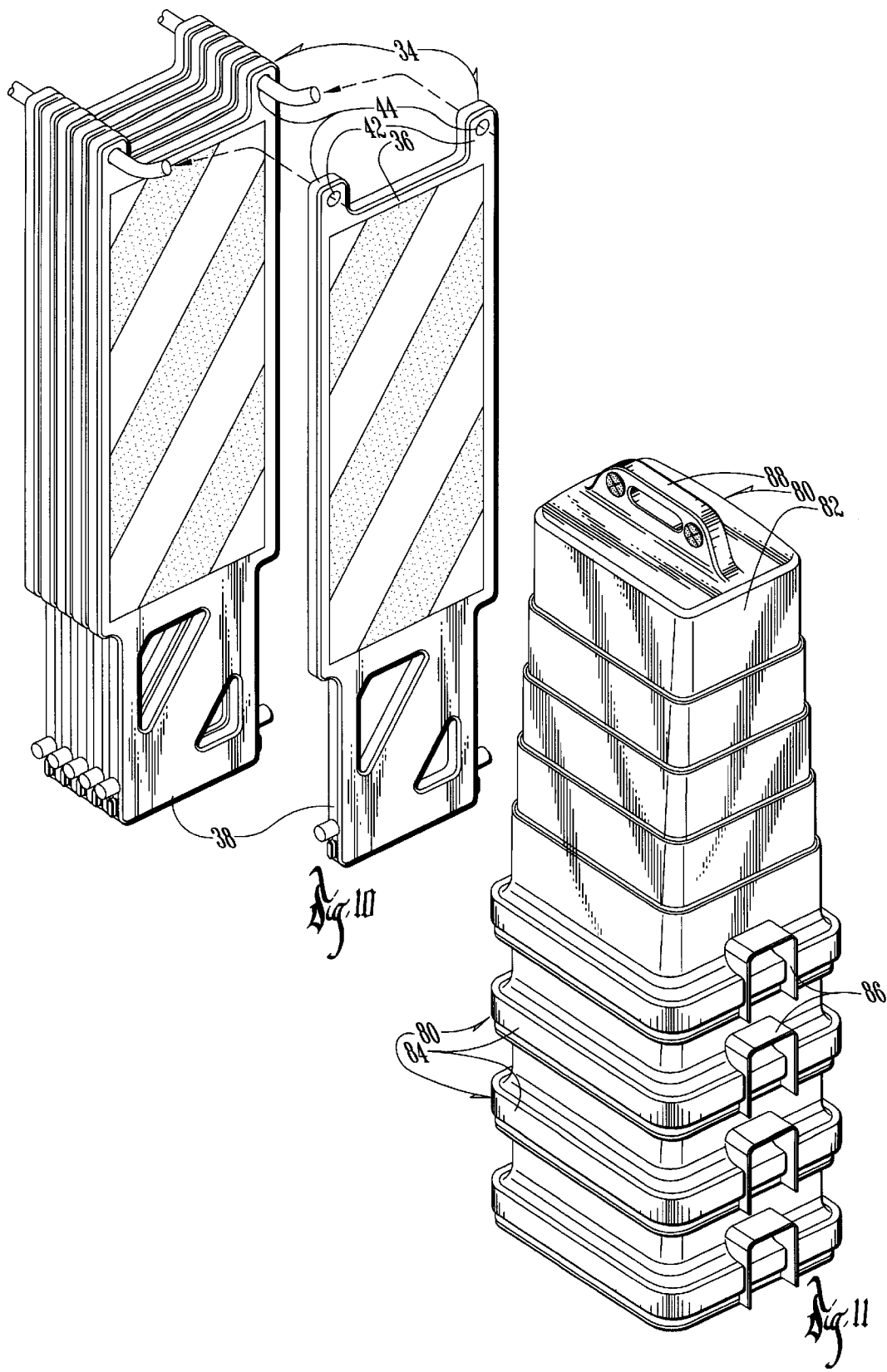

PORTABLE SIGN OR BARRICADE

BACKGROUND OF THE INVENTION

A. Field of the Invention

The present invention relates to an apparatus for use as portable signs or indicators, for example, as traffic or construction barricades.

B. Problems in the Art

In today's society the number of automobiles continues to increase, as does the number of miles and sophistication of roadways. As a result, the need for maintenance and repair of such roadways has increased, as has the need for temporary traffic control signs to alert and direct motorists through, for example, construction zones.

Safety is a primary concern. This concern is directed not only to motorists but also to repair and construction persons at the site. There are numerous examples of accidents occurring in construction zones. Therefore, making motorists aware of the construction, as well as clearly marking out the construction zone, to physically distinguish it from the correct path of travel, are significant concerns to governments, construction companies and motorists.

There are currently a number of traffic barricades in use. Conventional, long-used types include a metal legged device, hinged at the top, having wood or metal horizontal panels with stripes; sometimes reflective stripes. Advantages of this type of device include the ability to fold it down for easy handling and storage. It also is relatively stable, but many times sand bags or other ballast is used to try to secure it in place against wind or brushing by vehicles. A significant disadvantage is its weight (wood and metal parts), its durability, and its susceptibility to damage as well as the risk of creating serious damage to vehicles. There are also "A-frame", saw horse type devices that use two A-shaped side frames and an elongated board there between.

Another type frequently used are barrels, painted or otherwise having striping or high visibility and/or reflective indicators around the vertical sides. Disadvantages include the amount of space they consume when stored or transported, the difficulty in handling, and the difficulty in securing them in place outside on the road. Their durability is also limited.

In more recent times, attempts at addressing some of the above-mentioned problems have been made. For example, the use of plastics as increased. Also, there have been uses of high visibility webbed fences, single vertical tubes, and spring-loaded vertical panels attached to bases. However, each has certain problems and deficiencies.

For example, use of fencing is not feasible for large distances, such as miles of highway construction. It would simply take too much fencing to be economical, or practical from the standpoint of transport and handling.

The use of the vertical tubes or posts is sometimes deficient because they are relatively small and therefore lack visibility. The same is generally true of traffic cones.

The use of spring loaded vertical panels improves visibility over vertical narrow tubes, but they must be attached to a larger base. Therefore, to have both spring loading to return to a normal position if struck, and have sufficient ballast to withstand wind and impact, they are difficult to store compactly and thus handle efficiently. The vertical panel may be removed from the base, but it usually requires tools and labor to both assemble and disassemble. Many require the use of sand bags or other ballast to help hold them in place.

Therefore, the following considerations are believed to come into play with traffic barricades. First, there are safety concerns; namely the barricade must have as much visibility as possible, both in day and night, to catch motorists' attentions. It also must adequately instruct the motorist to follow a certain authorized path or obey certain rules. This can be done by indicia on the barricade (words or symbols) or simply by their physical placement along the road. Therefore, it usually must have a relatively significant amount of area to communicate such information to the motorist, and can not be a simply a slim tube or the like.

Second, ease of handling, storage, set up and take down is important. Stackability and reduction of size for shipment and storage is preferable. However, the ability to quickly and easily assemble and disassemble is also important, preferably without tools.

Third, durability is an advantage. Wood and metal have inherent durability problems, not matter how carefully handled. Durability is relevant not only to how well the barricade stands up to the elements, such as rain, freezing, heat, wind, etc., but also to how well it can stand both minor and major impact by vehicles traveling at highway speeds. Wood or metal either break or can be damaged beyond repair.

Fourth, flexibility is a subtle but important consideration. Many barricades work well for one purpose or function, but are not adaptable, or do not work well for another. For example, there are Department of Transportation regulations which define the types of traffic signs and barricades that are indicated for certain situations. Some of the regulations pertain to the size and area of the indicators, such as whether one panel or two, the size of the panel(s), etc. Others apply to the configuration of the barricade, for example, a barrel versus a vertical panel versus fencing. Most existing barricades work for one situation only, or at least are not easily adaptable for several situations. In this specification the term vertical sign will be used to refer to various sign types, shapes, sizes and configurations, including those that are planar and stand vertical. This can include, but is not limited to, Types I, II and III DOT barricades, as well as what is conventionally known as a "vertical panel" barricade. Also, in this specification, the term barrel will be used to refer to drum type barricades.

Also, there is a need in the art for stable, resilient, durable, portable signs for a variety of uses. An example is "for sale" signs used by realtors for houses. They are needed for limited periods of time and are reused. Storage in a collapsed form is desirable for space considerations. Portable or temporary signs for other applications which improve over the state of the art are needed There is therefore a real need for an improvement in the art. It is therefore a principle object of the present invention to provide a portable sign or barricade which improves over or solves the problems and deficiencies in the art.

Further exemplary objects and features of the present invention include:

1. The ability to provide high visibility and adequate instructions to, for example, motorists to promote safety.

2. The ability to reduce in size for efficient stacking for transport, storage, and handling, including the ability to be assembleable and disassemblable quickly and easily without tools.

3. The ability to be durable in outdoors conditions, over the extremes in temperatures and weather, as well as to resist damage from minor forces as well as major forces.

4. The ability to be applied flexibly to different needs and situations, including the ability to have interchangeable signs or barricade types.

5. The ability to eliminate substantially the need for independent ballast such as sand bags to resist wind and impacts.

6. The ability to be made completely of recyclable materials.

7. The ability to be made of a minimum number of pieces without complex structure.

8. The ability to be manufactured, handled, transported, and stored efficiently and economically.

These and other objects, features, and advantages of the present invention will become more apparent with reference to the accompanying specification and claims.

SUMMARY OF THE INVENTION

The present invention is an apparatus that can be used for a number of different signage functions, including as traffic barricades. The apparatus includes a base with a hollow interior portion that can be filled with ballast. The base also includes a receiver that receives a mating portion of a vertical sign. The receiver and mating portion cooperate to connect and hold the vertical sign vertical, and to resist wind and other relatively minor forces, but to pivot downwardly to a folded down position when forces against it exceed a certain threshold. Additionally, the base receiver can receive different vertical signs. The base also can serve as a ballast for a barrel type sign or barricade, which is hollow and matingly fits around the base.

The apparatus can be made of materials that endure the weather and impact. Also the bases, vertical signs, and barrels are stackable and storable in efficient manners.

BRIEF DESCRIPTION OF THE DRAWINGS

FIG. 1 is a perspective view of an embodiment of the invention with a vertical sign, here a traffic barricade vertical panel, attached and installed in operational position to a base.

FIG. 2 is an enlarged isolated sectional view taken along line 2—2 of FIG. 1.

FIG. 3 is an enlarged isolated sectional view taken along line 3—3 of FIG. 1.

FIG. 3A is a sectional view taken along line 3A—3A of FIG. 1.

FIG. 4 is a perspective view illustrating the detachment of a vertical panel to the base of FIG. 1.

FIG. 5 is a perspective view of a Type II traffic barricade usable with the base of FIG. 1.

FIG. 6 is a perspective view of a barrel barricade inserted over the base of FIG. 1.

FIG. 7 is a illustrative view of the resistance of the device of FIG. 1 to damage by forces against it of a certain magnitude.

FIG. 10 is a perspective view of the stackability of the vertical panels of FIG. 1.

FIG. 11 is a perspective view of the stackability of the barrel barricades of FIG. 5.

DETAILED DESCRIPTION OF THE PREFERRED EMBODIMENT

A. Overview

Figure 8:
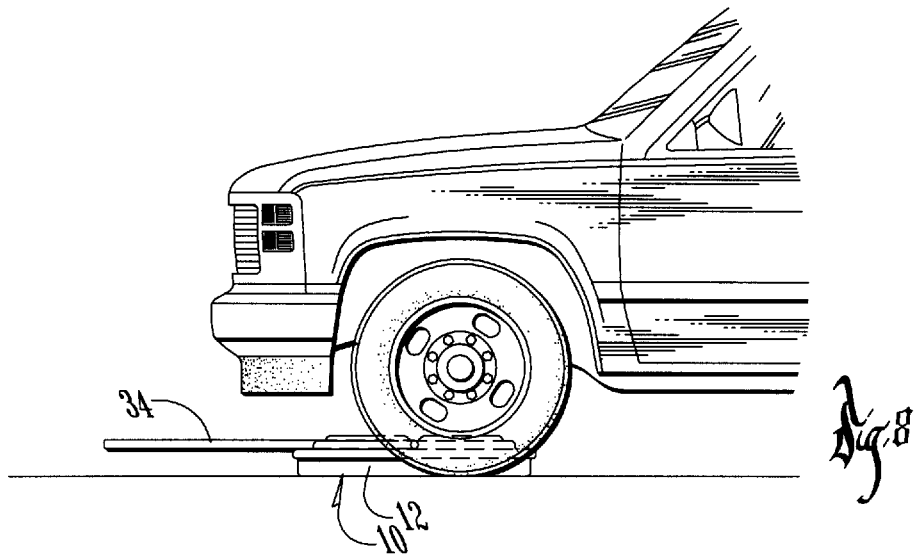
FIG. 8 is a illustrative view similar to FIG. 7, but showing how the vertical panel of FIG. 1 resists damage by forces exceeding a certain magnitude by folding down.

To assist in a better understanding of the invention, a preferred embodiment will now be described in detail. The preferred embodiment will be discussed in the context of traffic barricades. Examples are vertical panel, Type I, Type II, Type III, and barrel type barricades, such as are known in the art. It is to be understood, however, that although the following description of a preferred embodiment of the invention is in the context of those types of devices for traffic control, other types of traffic signs or barricades, for example, are arrow boards, cones, and vertical tubes and other uses, functions, or purposes for other types of signage or information or indicia-bearing devices are within the scope of the invention, and the following description is not intended to nor does it limit the scope of the invention as claimed. Different sizes, configurations, information, ornamentation, and functions are possible.

Frequent reference will be made to the drawings. Reference numbers will be utilized to indicate certain parts and locations in the drawings. The same reference numbers will be used to indicate the same parts and locations throughout all of the drawings unless otherwise indicated.

Figure 9:
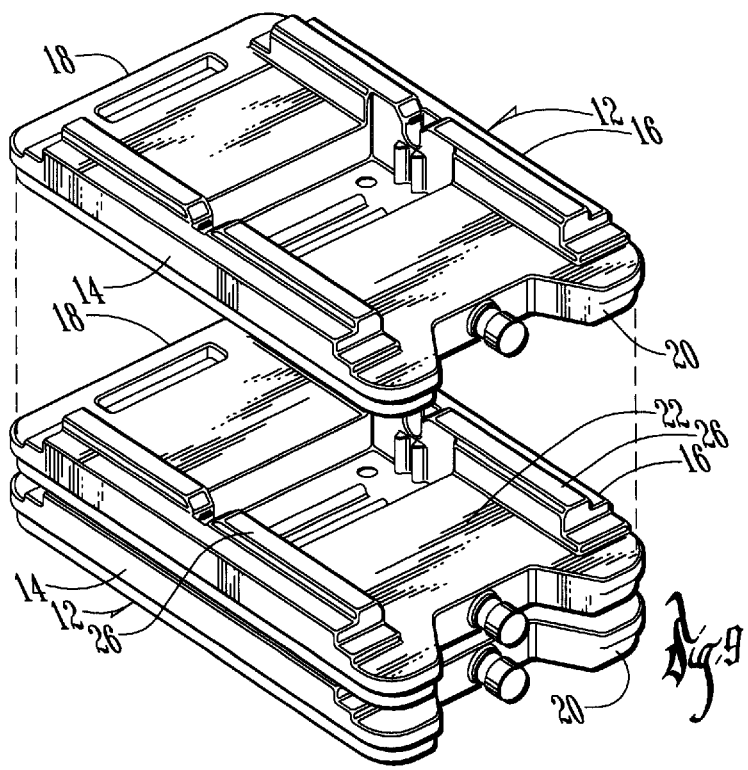
FIG. 9 is a perspective view illustrating the stackability of the bases of FIG. 1.

FIG. 1 shows a device 10 according to a preferred embodiment in the invention. A base 12 includes generally opposite sides 14 and 16, opposite ends 18 and 20, top 22, and a bottom 24. Base 12 also can have L-shaped in cross section raised portions 26 along sides 14 and 16, which are useful in allowing stackability of a plurality of bases 12, one on top of another (see FIG. 9).

Base 12 also includes a hollow interior that is accessible through spout 28. Spout 28 can have a threaded end to which threaded cap 30 can be removeable secured. Sand or other ballast (e.g. water) can be easily inserted into base 12 to provide a stable, weighty base against windload and other forces. The ballast can also be easily removed to facilitate easier handling. A handle 32 can to positioned on end 18 to assist in easy handling.

As will be appreciated by those skilled in the art, the precise details of the construction of base 12 can vary according to the needs and requirements of the application. Furthermore, the dimensions of base 12 and device 10 can vary according to the needs and requirements of the application.

FIG. 1 illustrates the basic working components of device 10. What is called in the art a vertical panel 34 has a portion 36 (front and back) that can display highly visible and reflective indicia (on both sides) such as the conventional white and orange angled stripes. A connection or mating portion 38 of vertical panel 34 cooperates with a receiver 40 in base 12 to removablly mount vertical panel 34 to base 12. Ears 42 can be placed on the top of vertical panel 34 and have apertures 44. The apertures 44 would match with parallel, spaced apart rods to allow easy stackability of vertical panels 34 (see FIG. 10).

Note that vertical panel 34 of FIG. 1 is denominated as a "vertical panel" barricade by Department of Transportation (DOT) regulations. It has a certain area for the striping, as well as the width, color, and visibility/reflectivity of the striping. A vertical panel has general dimensions of approximately 8–12" wide by 36" tall. In the preferred embodiment, base 12 has general dimensions of 24" in length by 16" in width by 3½" in thickness. The hollow interior, when full of sand or water, would cause base 12 to weigh on the order of 30 to 50 pounds. This is well within reasonable weight to keep a vertical panel, or DOT Type I or Type II barricades in position against the normal range of wind and other forces experienced by traffic barricades.

Note too in FIG. 1 that connection portion 38 includes openings 46 and 48 which cooperate to reduce the amount of area of panel 34 against wind.

FIGS. 2–4 illustrate more particularly the attachment of vertical panel 34 to base 12. As can be seen in FIG. 4, base 12 includes what is called generally a receiver 40 located laterally across the middle of base 12. Receiver 40 receives the lower end 54 of mating portion 38 of vertical panel 34. Note that mating portion 38 has pins 50 extending laterally outward from opposite sides and tabs 52 extending laterally outward from opposite sides below pins 50. Receiver 12 includes mating notches or cradles 56 for pins 50 along raised portions 26. Notches 56 include a bottom wall 58, opposite side walls 60 and 62, and an end wall 64. A groove 66, defined by raised ridges 68 and 70, is formed to receive each tab 52 in a vertical manner.

A groove 72, defined by raised ridges 74 and 76 extending upwardly from top 22 of base 12, receives the bottom edge 54 of portion 38 in a vertical manner. Bottom edge 54 is basically force-fit into grove 72 in frictional engagement between ridges 74 and 76 (See FIG. 3A). Drain holes are placed in base 12 to deter water from standing in its top surface.

FIG. 4 shows in more detail receiver 40 for one side of base 12, but the opposite side is identical. FIG. 1 illustrates that insertion of vertical panel 34 into base 12 is done by vertically aligning the lower end of portion 38 of panel 34 with receiver 40 in base 12; lowering panel 34 downward so that (a) each pin 50 is received in a notch 56, (b) each tab 52 vertically enters a groove 66, and finally lower edge 54 of mating portion 38 vertically enters groove 72 when panel 34 is seated into base 12. Tabs 52 and raised portions 68 and 70 along grooves 66 maintain panel 34 in a vertical position, along with lower edge 54 and raised portions 74 and 76 along groove 72.

FIGS. 2 and 3 illustrate the cooperation of lower edge 54 and groove 72 when panel 34 is seated in base 12. FIG. 2 illustrates the cooperation of pin 50 and notch 56 when panel 34 is seated in base 12. Note that notch 56 also has inward extending flanges 78 (see FIG. 2) that define a gap that is slightly less in width that pin 50. Pin 50 therefore has to be force fitted through the gap between flanges 78 to be seated into notch 56. Pins 50 essentially "snap in" to notches 56. Flanges 78 therefore retain panel 34 to base 12 against vertical removal, unless sufficient upward force is exerted to pull pins 50 past flanges 78.

Pins 50 form a pivot axis for panel 34 relative to base 12. However, tabs 52 are configured to be of a size that they are retained in grooves 66 and prevent pivoting of panel 34 around pins 50 unless a sufficient force is exerted from the front or rear of panel 34 to move tabs 52 out of grooves 66, past either raised portions 68 or 70. Likewise, lower edge 54 of portion 38 of vertical panel 34 is retained in groove 72 and prevents pivoting of panel 34 unless sufficient front or rear force on panel 34 is experienced to move lower edge 54 past either raised portion 74 or 76. It can be seen that tabs 52 and lower edge 54, as well as raised portions 68, 70, 74, and 76 have rounded or slightly angled outer edges to allow repeated movement past each other without damage. Panel 34 and base 12 are also made of plastic, which has a certain amount of flexibility to accomplish both retainment of panel 34 but survive a forced movement of tabs 52 and lower edge 54 out of grooves 66 and 72.

It is to be understood that both tabs 52 and lower edge 54 may not be necessary to allow device 10 to adequately function. Tabs 50 with the corresponding grooves 66, or lower edge 54 with corresponding groove 72, alone can be sufficient. Use of both gives extra stability and resistance to pivoting.

It is to be further understood, however, that the structure described above does the following. It allows easy assembly and disassembly of panel 34 from base 12. All that needs to be done is to vertically snap panel 34 into base 12 or snap it out. Again, the size, shape, and materials are selected so that the snapping in or out can be done easily by one person without much effort, yet retains panel 34 in vertical position. Only relatively straight up vertical force on panel 34 against base 12 will allow its release. Such force does not usually occur as a result of impact with automobiles.

The configuration resists what will be called relatively minor forces against it from any direction because of its plastic material, which can absorb certain forces without damage, or without damage that affects the performance and continued use of device 10. Ballast in base 12 assists in resisting any tipping of device 10. Relatively minor forces directly from the front or rear of panel 34 are handled by the ability of panel 34 to flex slightly in base 12 (see illustration at FIG. 7). The plastic material has resiliency and will cause panel 34 to return to its original position (FIG. 1) after the removal of the force.

However, a particularly important feature of device 10 is that if force against panel 34 overcomes the retention of tabs 52 and lower edge 54 in grooves 66 and 72 respectively, panel 34 will not usually separate from base 12, but will pivot or fold downwardly to lay flat (see FIG. 8). Thus, device 10 resists breakage, but stays together as a unit (panel 34 and base 12) so that it can be quickly and easily be reset to the position of FIG. 1.

If side forces are experienced against panel 34, device 10 may simply tip over, but retain connection as a unit. Again, it is not usual that direct side force will be experienced however.

Figure 12:
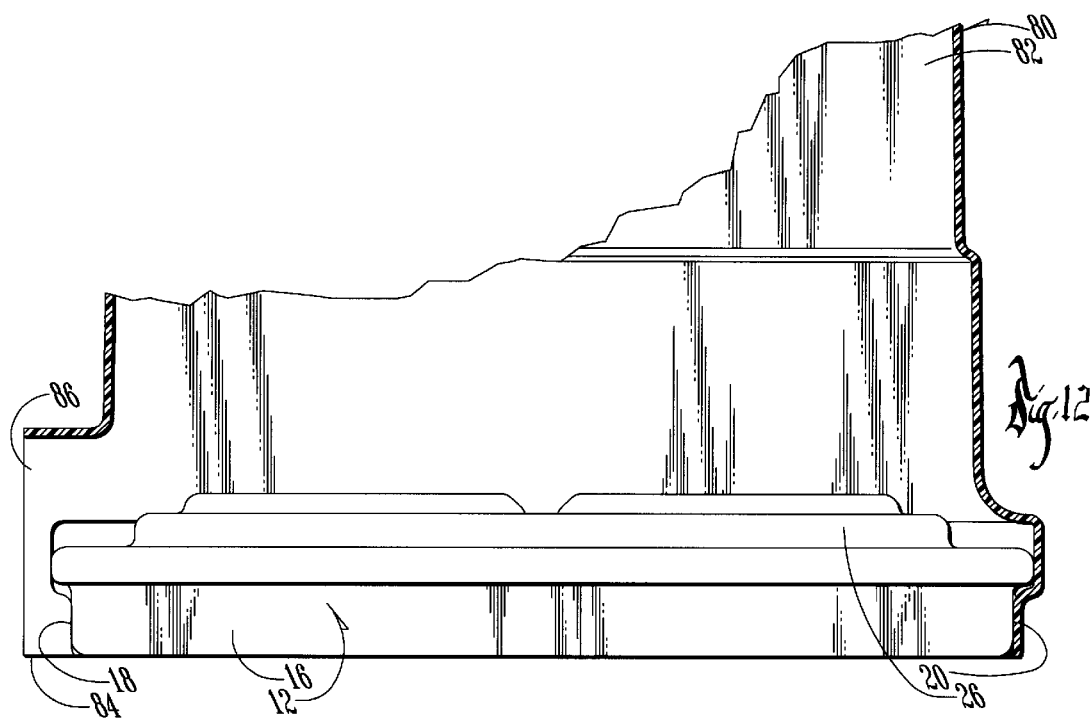
FIG. 12 is an enlarged sectional view taken along line 6—6 of FIG. 6.

FIGS. 6 and 12 illustrate that base 12 can be advantageously used as the base or ballast for a barrel 80, having a body 82 defining a hollow interior, an open bottom end 84, openings 86 on opposite sides of the barrel bottom, and a handle 88. The open bottom end 84 matingly fits around the perimeter of base 12 (FIG. 12). There is a "snap-on type of connection and frictional fit between the two (See right side of FIG. 12). Thus, the hollow barrel then has a heavy base to resist tipping of the barrel by wind or impact. However, if sufficient force is experienced against barrel 80, it will either tip with base 12 in place, or will tip over from base 12. In either event, it is easily reassemblable. Barrel 80 can have high visibility and/or reflective colors or decals, such as the striping, or other colors or designs. Openings 86 assist in removing barrel 80 from base 12 as well as assist in allowing barrel 80 to break away from base 12 upon sufficient impact or force. FIG. 11 shows how barrels 80 can be easily and conveniently stackable for transport and storage.

FIG. 5 illustrates an alternative example of a vertical sign traffic barricade usable with base 12. Here vertical sign 34A is a Type II traffic barricade, under DOT regulations. It has more area and has two striped areas 90 and 94 in its display portion 36A. Portion 36A also includes an intermediate section 92 that does not have orange and white reflective alternating stripes. Intermediate section 92 does have alternating openings 96 and solid areas 98. Like panel 34 of FIG. 1, the mating portion 38A of panel 34A also has alternating solid areas and openings.

The connection structure of panel 34A to base 12 is the same as with the device of FIG. 1, namely pins 50, tabs 52 and tab 54. Also, panels 34A can have ears 42 to facilitate handling and storage (see FIG. 10). Type I barricades, as known in the art, are similar to Type II, but with one area of stripes per side and are structurally similar to Type II and would connect to base 12 identically.

Operation of device 10 has been set forth above. A barricade type is selected. Examples are panel 34, Type II barricade 34A, or barrel 80. Others are possible, as are devices having uses other than traffic barricades. The barricade type or types (if more than one is selected) are taken from stacked storage (see FIGS. 9–11), placed on a transport vehicle (usually in stacked positions for conservation of space), and taken to the location they are needed.

Assembly is easily accomplished. Ballast (e.g. sand or water) can be placed in the bases 12 before or after assembly. Assembly can take place as the vehicle is moving from barricade position to barricade position (e.g. along a roadway) by taking the selected barricade type and snapping it into receiver 40 in the base (e.g. panels 34 or 34A) or placing it over the base (e.g. barrel 80). Panels 34 or signs 34A can even be assembled in a folded down position (FIG. 8) and then afterwards, personnel can pivot the panels or signs up to vertical (FIG. 1).

Once in place, devices 10 can withstand the elements and relatively minor forces while staying in the original configurations of FIG. 1. If greater forces are experienced, panels 34 or signs 34A may pivot down (FIG. 8), but are easily placed back to original position (FIG. 1).

Once their function is completed, devices 10 can be disassembled, stored on a vehicle for transport to a different location, or taken to a storage facility and stored in a space saving fashion.

It will be appreciated that the present invention can take many forms and embodiments. The true essence and spirit of this invention are defined in the appended claims, and it is not intended that the embodiment of the invention presented herein should limit the scope thereof.

For example, base 12 and vertical signs 34 and 34A are made by blow-molding them out of heat and cold resistant hi-density, UV enhanced polyethylene plastic. Other types of plastic or even other materials are possible.

Other forms of connection of a panel or vertical sign to the base can also be utilized.

In the preferred embodiment, the following dimensions are used, but others are possible depending on desire or need:

Base 12—16" wide, 24" long, 2⅛" thick to top 22 (3½" thick to the top of L-shaped members 26).

Panel 34—37.25" tall (excluding ears 42), 11.82" by 23.94" area front and back for orange and white stripes, 12.63" total width, 0.75" thick.

Type II barricade 34A—40.250" tall (including ears 42, which are 1.5" tall), 25.250" wide, 0.75" thick. Display areas 90 and 92 are 8.250" tall by 24.250" wide. Mating portion 38A is 12.25" tall by 10.030" wide.

Pins 50 are 0.750 in diameter, 1" long, and have centers placed 2.250" above the very bottom of panel 34A.. Tabs 52 are 0.840" long and 0.1695" thick and are position 0.500" above the very bottom of panel 34A The solid areas of the mating portions 38 or 38A of panel 34 or sign 34A are typically 4" wide and angled at approximately 45 degrees.

Barrel 80 is 40.184" tall (including 4" tall by 2" wide handle 88). It is generally rectangular in cross-section to match base 12 and therefore is 16.542" at its widest point in one dimension, and 25.5" at its widest point in the other dimension. The barrel 80 then stair steps up to its top which is 10.750" wide in one dimension and 19" in the other dimension. Openings 86 are 6" wide by approximately 5.5" tall.

Bottom edge 54 is approx. ¾" wide. Grooves 66 are approximately ³⁄₁₆" wide whereas groove 72 is approximately ¾" wide. Raised portions 68 and 70 are approximately ¼" wide, whereas raised portions 74 and 75 are approximately ½" wide.

The display areas of the vertical panel 34 and sign 34A can be reflective sheeting with orange and white alternating 4" or 6" stripes (the size can vary). Such material is available from 3M of St. Paul, Minn. Specific specifications for such material is available from DOT regulations such as Federal Manual of Uniform Traffic Control Devices through FHWA or Federal DOT, or State DOT's.

Figure 13:
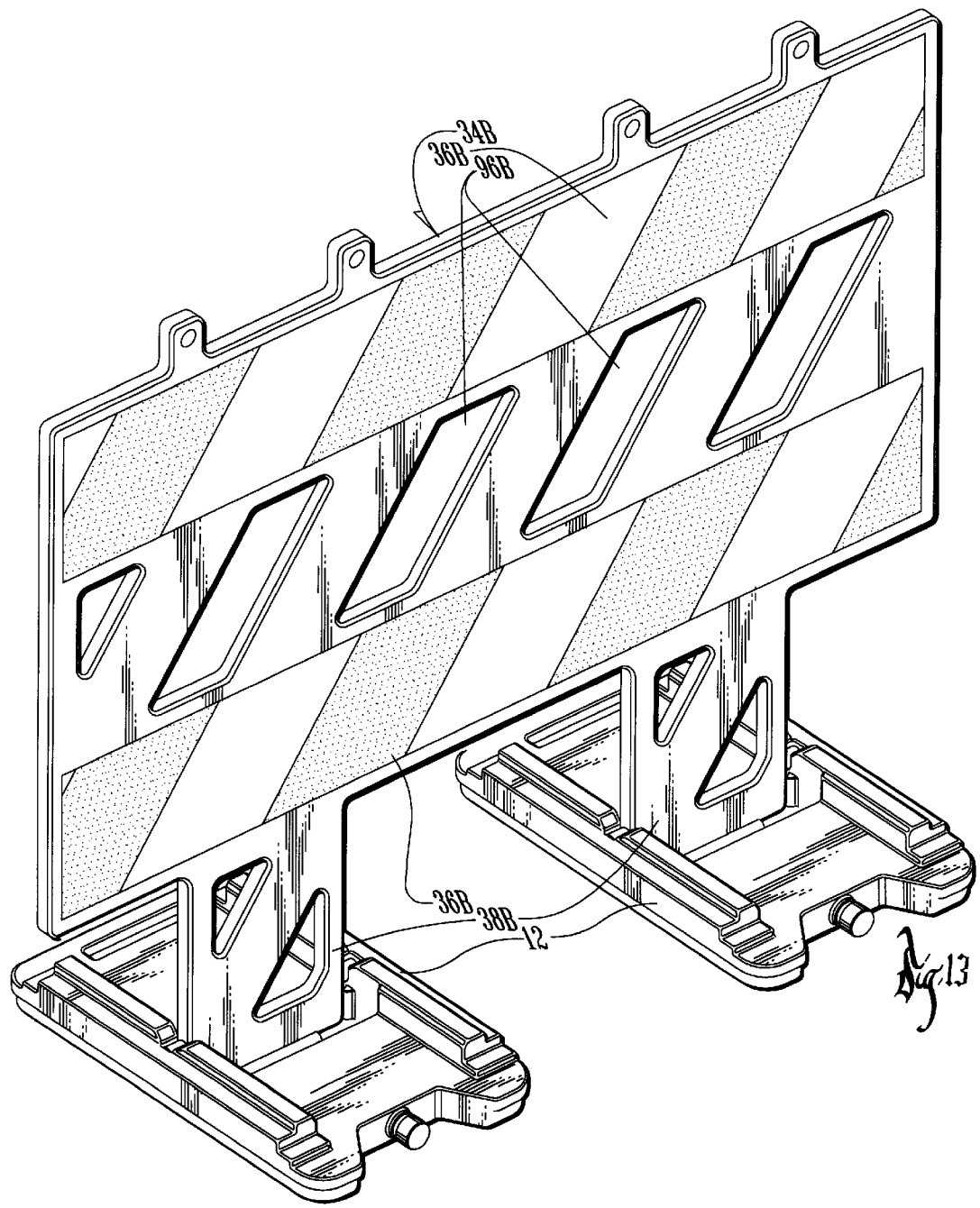
FIG. 13 is a diagrammmatical view of another type of vertical sign and base combination according to the invention.

FIG. 13 shows a DOT Type III barricade with a vertical panel 34B (here approx. 8 feet wide by 5 feet tall) with three horizontal strips of reflective sheeting 36B. Two mating portions 38B (identical to mating portion 38) cooperate with two base 12 to hold panel 34B up.

We claim:

1. An apparatus for supporting a vertical structure comprising:
   a) a base;
   b) a vertical panel member including an upper end with a display portion and a lower end with a lower edge and opposite side edges;
   c) a pair of pivot pins extending outwardly to free outer ends along an axis from side edges of opposite edges of said vertical member and spaced above the lower edge of the lower end of the panel member;
   d) a pair of receivers aligned along a pivot axis in the base, each receiver including opposite side walls on opposite sides of the pivot axis, an open top, and a retainer to retain a pivot pin in place along the pivot axis but allow rotation of the pivot pin about the pivot axis when in place in the receivers, the receivers spaced to receive said pair of pivot pins of said panel member through said open tops of the receivers and journal said pivot pins when the panel member is assembled with the base;
   e) the retainer and the opposite side walls preventing any movement of the panel member relative to the base except for pivotal movement around the pivot axis; and
   f) a releasable positioning member on the base below the pivot axis including raised portions on the base adapted to receive one of said bottom edge or said side edges of said panel member when assembled to the base and in a generally vertical position, to hold the vertical member vertical unless a sufficient force overcomes the positioning member thereby allowing the panel member to pivot about the pivot pins in the receivers and fold down onto the base in either radial direction relative to the pivot axis.

2. The apparatus of claim 1 wherein the positioning member on the base comprises means that cooperate with at least one of a side edge and the lower edge of the lower end of the vertical member to prevent pivoting movement of the vertical member away from vertical when in the vertical position.

3. The apparatus of claim 2 wherein the positioning member comprises raised parallel portions positioned on the base in alignment with the vertical member when it is in the vertical position.

4. The apparatus of claim 3 wherein the raised portions cooperate with just the bottom edge of the panel member and are positioned below the pivot axis on a top surface of the base.

5. The apparatus of claim 3 wherein the raised portions cooperate with a side edge of the panel member and are positioned below the pivot axis on an interior side wall of the base.

6. The apparatus of claim 3 wherein the raised portions cooperate with both side edges of the panel member and are positioned below the pivot axis on opposite facing interior side walls of the base and with the bottom edge of the panel member and are positioned below the pivot axis on a top surface of the base.

7. The apparatus of claim 1 wherein the receivers are voids approximately equal in diameter to a pivot pin and defined by surfaces in the base, including a bottom wall, opposite side walls on opposite sides of the pivot axis, and an outer end wall, but having an open top and an open inner side opposite the outer end wall.

8. The apparatus of claim 1 wherein the retainer comprises inner facing raised portions projecting towards each other from the opposite sides of the receivers, the portions defining an opening that is smaller than the diameter of a pivot pin but allows forcible passing of a pivot pin.

9. The apparatus of claim 1 wherein the base includes a top surface, a depression in the top surface to receive the lower end of the panel member, and the receivers are at opposite sides of the base and the depression.

10. The apparatus of claim wherein 1 the base includes an interior hollow to hold removable ballast.

11. A traffic barricade comprising:

a base;

a vertical member including a bottom end and opposite sides;

pivot pins extending from opposite sides of the bottom end of the vertical member along a pivot axis;

snap-in receivers in the base removably receiving and releasably locking said pivot pins to said base when said vertical member is assembled with said base, but allowing rotation of pins in receivers around the pivot axis between a generally vertical position and a folded down position in either of opposite directions;

means to hold the pivot pins in place along said pivot axis unless a sufficient removing force is experienced to release the pivot pins from the snap-in receivers;

means to hold the vertical member in said generally vertical position unless a sufficient force is experienced by the vertical member to cause it to be released from the generally vertical position and to pivot down around the pivot axis to a folded down position.

12. A base for supporting a vertical structure comprising:

a) a housing having a bottom, top, sides and ends, and including an interior enclosed space accessible through a closable opening in the base for storing ballast material;

b) a pair of receivers aligned along a pivot axis in the base, each receiver including opposite side walls on opposite sides of the pivot axis, an open top, and a retainer adapted to retain a pivot pin in place along the pivot axis but allow rotation of the pivot pin about the pivot axis when in place in the receivers, the receivers spaced to receive a pair of pivot pins through said open tops of the receivers and journal pivot pins;

c) the retainer and the opposite side walls adapted to prevent any movement of a pivot pin relative to the base except for pivotal movement around the pivot axis;

d) a releasable positioning member on the base below the pivot axis including raised parallel portions spaced apart adapted to receive an edge of a vertical member when assembled to the base and hold the vertical structure in a generally vertical position.

13. The base of claim 12 further comprising a vertical structure removeably attachable to the base.

14. The base of claim 13 wherein the vertical structure is a vertical panel member including an upper end with a display portion and a lower end with a lower edge and opposite side edges.

15. The base of claim 14 wherein the vertical structure further comprises a pair of pivot pins extending outwardly to free outer ends along an axis from side edges of opposite edges of said vertical panel member and spaced above the lower edge of the lower end of the vertical panel member.

16. The apparatus of claim 12 wherein the base includes a shoulder having a raised portion for receiving a barrel-shaped generally hollow structure which has an opening that matingly fits over the shoulder of the base.

17. The apparatus of claim 15 wherein the vertical panel member further comprises a tab extending from an edge of the lower end of the vertical panel member beneath the pivot pins, the tab being insertable into a retaining structure in the base to maintain the vertical panel member in a generally vertical position unless sufficient force is exerted against the vertical panel member to cause the tab to move out of the retaining structure, whereupon the vertical panel member would pivot around said pins and fold down against the base.

18. The apparatus of claim 17 wherein the tab extends from an edge on the lower end of the vertical panel member and is aligned with the axis formed by the pins, and the retaining structure is positioned transversely across the base between the receivers.

19. The apparatus of claim 17 wherein the tab extends outwardly from a side of the lower end of the vertical panel member and the retaining structure is vertically positioned and transverse to an axis through the receivers.

20. The apparatus of claim 13 wherein the vertical structure is a traffic barricade vertical panel selected from the set comprising a Type I, a Type II and a Type III traffic barricade.

* * * * *